Sept. 25, 1962
A. M. CHRISTY
3,055,148
METHOD FOR MAKING SIMULATED ROCK PANELS, AND
ARTICLE FORMED THEREBY
Filed June 24, 1957
2 Sheets-Sheet 1
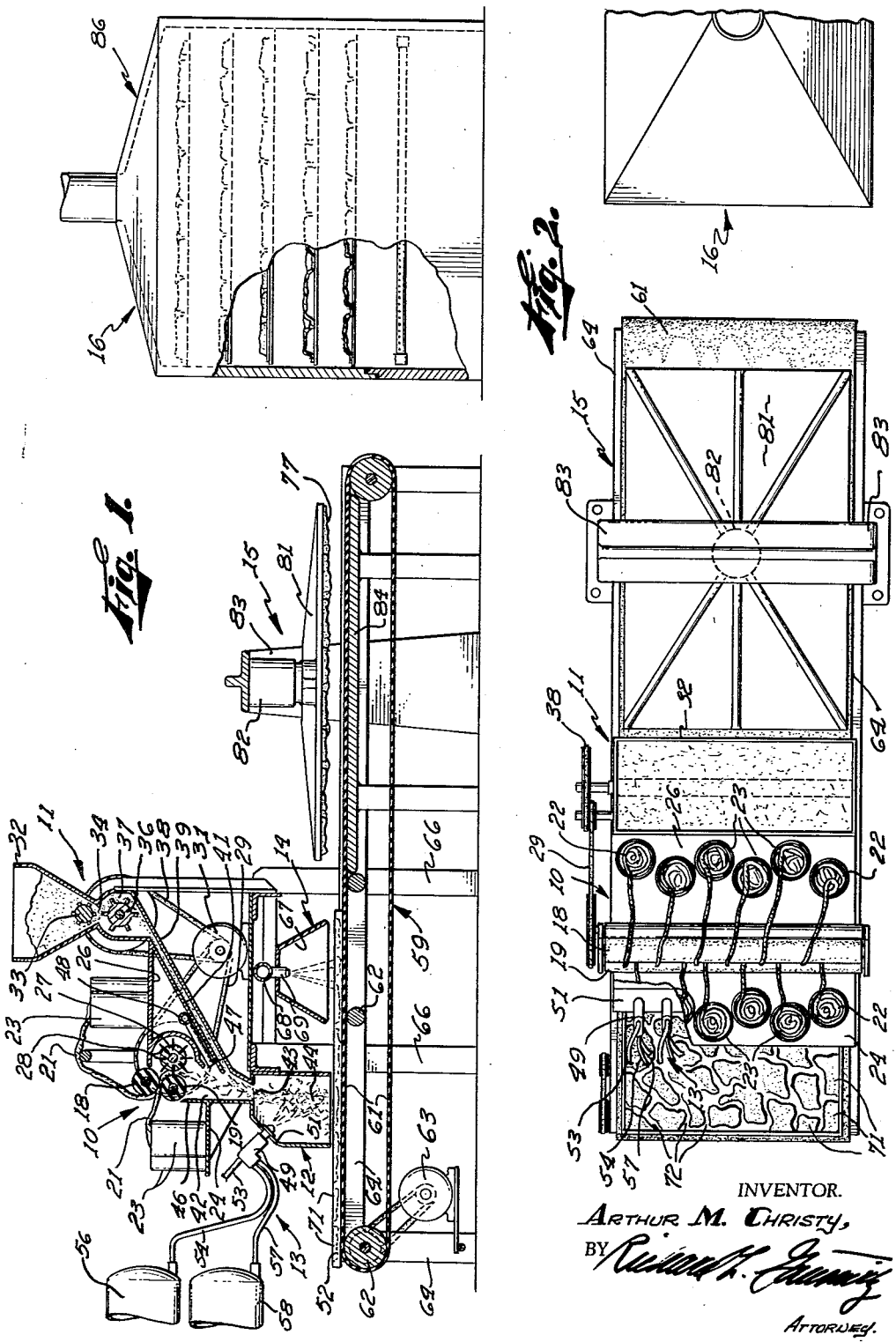
INVENTOR.
ARTHUR M. CHRISTY,
BY
ATTORNEY.

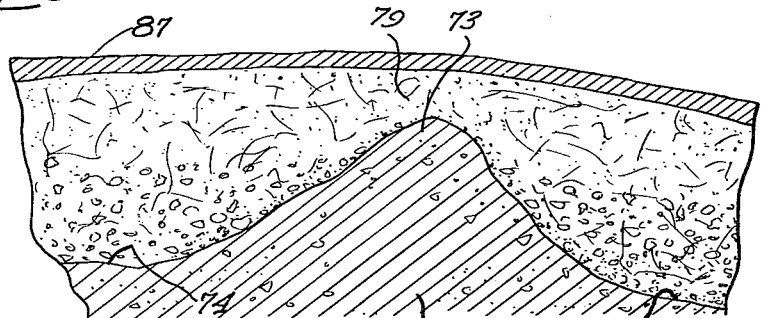
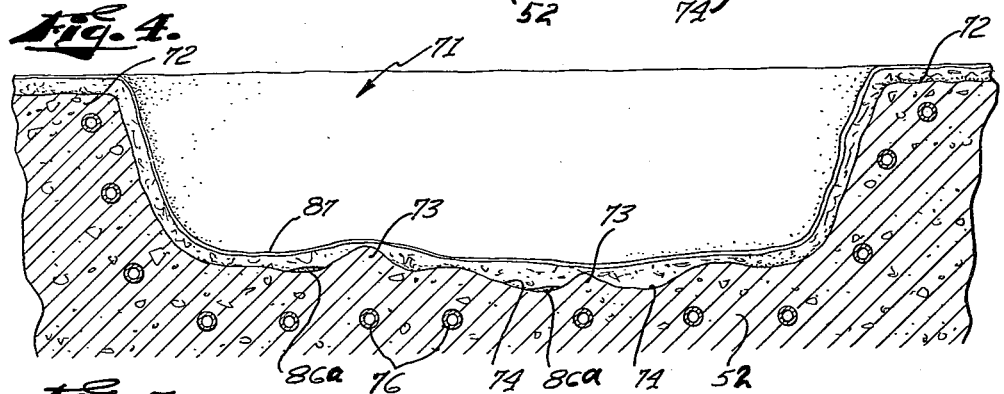
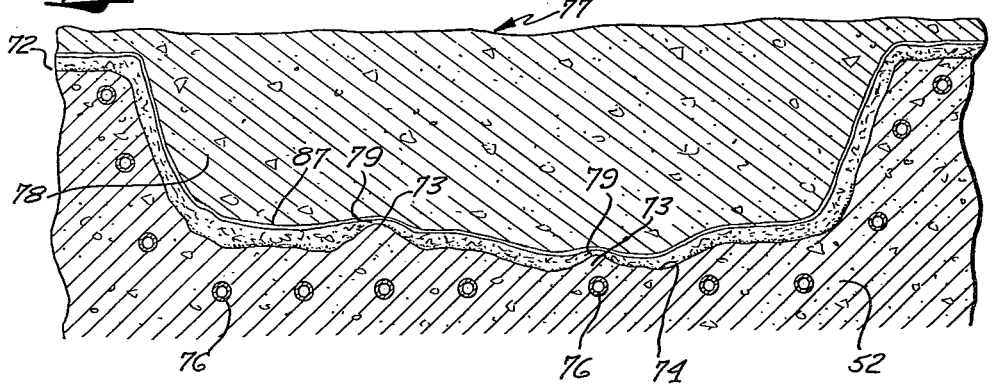
INVENTOR.
ARTHUR M. CHRISTY,
BY
ATTORNEY.

United States Patent Office 3,055,148
Patented Sept. 25, 1962

3,055,148
METHOD FOR MAKING SIMULATED ROCK PANELS, AND ARTICLE FORMED THEREBY
Arthur M. Christy, Garden Grove, Calif., assignor of twenty percent to Richard L. Gausewitz, Santa Ana, Calif.
Filed June 24, 1957, Ser. No. 667,656
8 Claims. (Cl. 50—268)

This invention relates to a method and apparatus for manufacturing artificial rock and rock panels adapted to simulate decorative stone work, and to the article formed thereby.

Decorative stone work is very expensive, not only because of the cost of the stones or rocks themselves but also because of the extremely high labor cost. Furthermore, decorative stone work is heavy, which means that the structural supports for such stone work must be strongly and expensively made. In addition, the great weight of the actual stone makes it impractical, because of transportation costs, to employ decorative stone work in portions of the country where satisfactory rock or stone is not found in nature. All of the above factors, excepting the last, apply also to conventional simulated stones such as are made with cement-sand mix. In addition to cement and similar mixtures, artificial rock panels have heretofore been manufactured of plastics, one such comprising a polyester resin containing a pigment and/or a filler and strengthened by fiber glass.

The artificial stone or rock mentioned in the preceding paragraph is highly deficient in that it does not have the true and natural appearance of the real product. Particularly in the case of the above-specified resin product, the absence of true rock texture and varied color, and the presence of gloss or shine, make it instantly apparent that the product is not real. For these and various reasons, such resin-type artificial rock has frequently required an exterior paint coating and has not found any substantial acceptance in the decoration of homes, stores, hotels, etc.

Prior simulated rock and rock panels, particularly of the resin-glass fiber type specified above, have not previously been made automatically and in volume production. Thus, the cost of even an inferior product has been so high as to greatly reduce or eliminate the desirability of the simulated product as compared to natural rock.

In view of the above and other factors characteristic of artificial rock or stone and the like, it is an object of the present invention to provide a method and apparatus for volume-manufacturing simulated rock panels which are highly natural in their shape, texture, color and freedom from gloss or shine.

A further object is to provide a simulated rock or stone panel which is light in weight, strong and easy to apply with low labor cost, yet needs no painting and has a texture, color and absence of gloss which is so realistic that the artificial product is comparable with the actual product.

A further object is to provide a method and apparatus for mass producing, without requiring artistic production men and in a substantially automatic manner, panels containing strengthening fibers and synthetic bonding resin, without resorting to hand lay-up and other methods previously employed.

A further object is to provide a method and apparatus for producing artificial rock or stone which is colored differently at several different elevations to thus provide a highly realistic appearance.

A further object is to provide a method and apparatus for producing simulated rock having true rock color, texture and appearance, and characterized by the substantial absence of gloss or shine.

These and other objects and advantages of the invention will be more fully set forth in the following specification and claims, considered in connection with the attached drawings to which they relate.

In the drawings:

FIGURE 1 is a schematic view, partly in elevation and partly in vertical section, illustrating one form of apparatus constructed in accordance with the present invention;

FIGURE 2 is a top plan view of the showing of FIGURE 1, portions being broken away to better illustrate the construction;

FIGURE 3 is an enlarged and exaggerated fragmentary vertical sectional view showing one mold peak or protrusion after application of the artificial rock forming ingredients thereto;

FIGURE 4 is a fragmentary vertical sectional view showing a female mold portion corresponding to one rock or stone, after application of the ingredients thereto such as by the apparatus illustrated in FIGURES 1 and 2;

FIGURE 5 corresponds to FIGURE 4 but illustrates the condition of the components and ingredients after insertion of a male plug; and FIGURE 6 is a fragmentary vertical sectional view illustrating a female mold having less contour than the one previously shown, and also illustrating the gloss eliminating and texture material applied to the mold surface prior to application of ingredients such as with the apparatus illustrated in FIGURES 1 and 2.

In the following specification, there will first be summarized the ingredients contained in the artificial rock or stone, after which the apparatus shown in FIGURES 1 and 2 will be described. This will be followed by a detailed description of the method, a description of the article and specific examples thereof, and a description of the uses and methods of application of the article.

Ingredients Contained in the Simulated Rock or Stone Panels

The first ingredient may be termed the texture material, and comprises ground or disintegrated rock or mineral matter having certain particle or granule sizes. The color and particle size of the texture material may vary somewhat, in accordance with the type of rock being simulated. Milled and graded limestone, marble, granite and lava are examples of texture materials which have been employed successfully.

The major portion of the texture material is in the range of minus 16 plus 80 U.S. standard sieve size. Stated otherwise, the bulk of the texture material will pass through a number 16 sieve (opening size 0.0468 inch) but will not pass through a number 80 sieve (opening size 0.007 inch).

The preferred range of texture material size is minus 16 plus 40 U.S. standard sieve size. Granules or particles within this range should be blended together, that is to say that the larger particles and the smaller particles within the range should be mixed or blended together instead of being employed alone. There should be a substantial amount of intermediate size, for example such as will barely pass through a number 30 sieve.

For many types of simulated rock it is preferred that the texture material naturally have the general color of the desired end product. However, for a number of applications it is practical and desirable to employ white texture material, such as ground limestone or marble, mixed with a coloring agent or pigment such as will be set forth subsequently herein.

It is emphasized that the texture material is not the same as dusts or fine materials, known as "fillers," which have previously been employed to fill and strengthen synthetic resin products. Instead, the texture material is adapted to impart texture or feel, of a relatively rough nature, to the finished simulated rock. The present texture material is, at least in major proportion, sufficiently large in granule size to produce the varied color or texture effects to be described in the method portion of this specification, with particular reference to FIGURE 3.

The texture material, in addition to its important function of imparting a natural appearance to the finished product, increases the hardness and abrasion resistance thereof. Accordingly, weathering of the simulated rock does not harm the appearance but instead has actually been found to enhance the beauty of the paneling.

The second ingredient in the simulated rock or stone is a synthetic bonding resin, and more particularly a thermosetting synthetic bonding resin. The resin being thermosetting, it results in a durable and abrasion resistant product which does not tend to soften when subjected to the sun, or various other sources of heat. The synthetic resin is transparent or translucent in order that the varied color effect, hereinafter described, may be achieved.

A preferred resin is a thermosetting polyester bonding resin of the type employed in the manufacture of boat hulls, etc. Another highly satisfactory resin is an epoxy resin, although these are more expensive than the polyesters and are thus less preferable. Other resins which may be employed are phenolics and modified phenolics, but these are also less preferable for reasons including the fact that they require more heat and pressure than do the polyesters and epoxys.

Catalysts are employed as necessary to aid crosslinking and produce the required polymerization. In the case of polyester resin a preferred catalyst is butyl peroxide. Methyl ethyl ketone peroxide is less preferable because the accelerator therefor has a purplish color. In the case of an epoxy resin, a suitable catalyst is diethylene triamine.

In addition to catalysts, accelerators (promoters or activators) are employed to increase the rate of polymerization and, desirably, produce a coloring effect. Thus, dimethyl analine, employed with the preferred butyl peroxide, produces a brown color which aids in achieving a natural rock appearance. In the case of the methyl ethyl ketone peroxide catalyst, an accelerator is cobalt naphthenate but this is purplish in color as above indicated.

The quantity and selection of catalysts and accelerators depends largely upon the desired pot life and other factors known to the resin art. The viscosity of the resin should be relatively low, on the order of light syrup.

The third ingredient contained in the simulated rock or stone comprises fibers. Glass fibers are preferred for reasons of strength, but in certain instances other fibers, such as asbestos, may be employed. According to a preferred form of the invention, the strengthening fibers comprise a large number of short or medium-length strands cut from continuous lengths of fiber glass spun roving. The roving comprises continuous strands each consisting of a large number of glass filaments, the filaments having extremely small diameters.

The fiber glass must be sized in order to facilitate wetting thereof, it having been found that silane sized spun roving is highly satisfactory. Such material may be purchased from the Owens-Corning Company.

The individual sections or pieces cut from the balls or spools of spun roving are preferably ½ inch in length, and may measure between ¼ inch and ¾ inch in length and still produce highly satisfactory results. Lengths shorter than ¼ inch are generally deficient as to strengthening characteristics, whereas lengths longer than ¾ inch are relatively unsatisfactory and difficult to handle in carrying out the method to be described hereinafter.

A fourth important ingredient in the simulated rock is a gloss eliminator or inhibitor which, when employed in the method of the invention, prevents the artificial rock from being shiny or glossy. A preferred gloss reducer or eliminator is finely divided mineral, preferably diamtoceous silica. The silica should have a particle size of minus 80 U.S. standard sieve size, by which is meant that it will pass through a number 80 sieve. Another gloss reducer or eliminator is low jell aluminum stearate powder.

A fifth ingredient is coloring material or pigment. This is preferably iron oxide powder or synthetic iron oxide powder and is normally brown, black or gray. Pigments such as carbon black are less preferable, and analine dyes and the like are generally unsatisfactory because of their fading characteristics.

A sixth ingredient is a flame retardant which is preferably incorporated in order that the resultant simulated rock will not support combustion. The retardant may comprise antimony oxide, antimony sulfide, bismuth oxide or gas forming materials such as calcium carbonate or magnesium carbonate. Chlorinated paraffin wax, sold under the trade mark "Chlorowax" by Diamond Alkali Company of Cleveland, Ohio, has been found to be highly satisfactory when employed in combination with antimony oxide.

In addition to flame retardant additives, the synthetic resin may itself be so constituted (such as from halogenated acids or crosslinking agents) that it will have a flame resistance. An example of this is "Selectron 5041" polyester bonding resin, sold by Pittsburgh Plate Glass Co.

Description of the Apparatus

Referring to FIGURES 1 and 2, the illustrated apparatus may be seen to comprise generally a means 10 for cutting and feeding fiber glass or other fibers, means 11 for feeding texture material, mixing and turbulence chamber means 12 for causing the texture material and fiber glass to mix with each other prior to striking the mold, and resin spray means 13 adapted to spray resin into the turbulence chamber means. The apparatus further comprises color application means 14, wetting enhancing and bubble eliminating means 15, and heat curing means 16.

The means 10 for cutting and feeding fiber glass comprises a pair of feed rolls 18 and 19 formed of relatively stiff and incompressible rubber or the like. The rolls 18 and 19 are in frictional engagement with each other so that rotation of one will result in rotation of the other and consequent feeding of strands 21 of fiber glass therebetween. The strands 21 are fed through the feeder rolls 18 and 19 at spaced longitudinal positions, being initially wound on balls or rolls 22 (FIGURE 2). One set of balls 22 is mounted in open-topped containers 23 on a shelf 24, whereas another set of balls 22 is mounted on corresponding containers 23 on a horizontal wall or shelf 26 between the fiber glass cutting and feeding means 10 and texture material feeding means 11.

Mounted adjacent the lower feed roll 19 is a cutting and driving roll 27 having a plurality of radially extending knives or blades 28. The knives 28 engage roll 19 to cause driving thereof and thus of roll 18, and also to cause severing into predetermined lengths the strands 21 being drawn between the feeding rolls 18 and 19. Such lengths, as previously stated, should be between ¼ inch and ¾ inch. The shaft of the roll 27 is driven through a belt 29 by a suitable motor 31. The direction of rotation of the roll 27 is counterclockwise as viewed in FIGURE 1, so that roll 19 rotates clockwise. Mounted adjacent the cutting and driving roll 27 is an arcuate wall, best illustrated in FIGURE 1.

The means 11 for feeding texture material, and certain other ingredients, comprises a hopper 32 which extends for the full width of the apparatus, as do the above-mentioned rolls, etc. Hopper 32 is adapted to contain an intimate mixture of a texture material, and preferably the gloss reducer and flame retardant. In certain instances, as will be described subsequently, the hopper 32 also contains coloring matter or pigment. Feeding means for delivering material from hopper 32 at a predetermined rate are provided, and comprise a first toothed or ribbed roll 33 provided above the transverse slot or gate 34 at the bottom of hopper 32, and a second toothed or ribbed roll 36 mounted in a chamber 37 below the slot or gate 34. The toothed or ribbed roll 36 is rotated at a controlled rate, for example by a belt 38 from the previously mentioned motor 31 which is a variable speed motor. The first toothed roll 33 is driven at a predetermined feeding rate by means, not shown, in order to meter the texture material at the gate or slot 34.

The texture material which drops off of the second roll 36 into the lower portion of chamber 37 passes down an inclined slide or chute 39 into the turbulence chamber or mixing means 12 just below rolls 19 and 27. Spaced above the slide 39 is a cover plate 41. Suitable vibrator means, not shown, may be employed to insure continued feeding of texture material down the slide 39.

The turbulence and mixing chamber means 12 comprises a downwardly convergent upper portion 42 which communicates through a transverse slot or gate 43 with a generally rectangular lower portion 44. Upper portion 42 is formed by a vertical wall 46, to which shelf 24 is secured, by the inclined chute walls 39 and 41, and by the arcuate wall adjacent cutting and driving roll 27. Upon reference to FIGURE 1 it will be understood that the cut sections of fiber glass drop into the upper portion 42 and come into contact with the texture and associated material emanating from slide 39. These ingredients then mix in a dry state, the mixture action being enhanced by air streams from pipes 47 which are fed by a header 48 connected to a suitable source of air pressure.

The mixed and turbulent materials pass through the slot or gate 43 into the lower portion 44 of turbulence and mixing chamber means 12, where they are acted upon by the resin spray means to be described hereinafter. The lower portion 44 has an open bottom, and has vertical walls which are preferably formed of a substance such as silicone impregnated vinyl in order to minimize sticking of resin thereto.

The resin spray means 13 comprises a horizontal row of double-headed spray guns 49 having their heads extending through an inclined wall portion 51 of turbulence and mixing chamber means 12. The spray guns 49 are directed downwardly at an angle, preferably approximately 45°, so that the spray will pass into the downwardly traveling texture material and fiber glass and will then come into engagement with the upper surface of a mold 52. It is pointed out that the pipes 47 from the air header 48 are inclined downwardly toward the slot or gate 43, so that the dry-mixed materials in upper chamber portion 42 pass downwardly through slot or gate 43 at a relatively rapid rate. This, in addition to the downward inclination of the spray from spray guns 49, causes the ingredients to impinge against mold 52 at a substantial velocity.

The operation of the spray guns 49, turbulence chamber means 12, etc., is such as to cause the ingredients to be both mixed and substantially completely wet by the resin prior to reaching the mold 52. The downward force of gravity, the blast from the spray guns, etc., aids in creating an important variation in the thickness and characteristics of the material on the upper mold surface, as will be described in detail hereinafter.

Each spray gun 49 is connected through a hose 53 to a suitable source of air pressure, through a hose 54 to a first resin pot 56, and through a hose 57 to a second resin pot 58. The first resin pot 56 contains resin and catalyst, whereas the second pot 58 contains resin and promoter or accelerator. The construction of each gun is such that material from one pot passes out one head, and material from another pot passes out the other head, so that the catalyst and promoter do not mix except in spray form in the lower portion 44 of the mixing chamber means 12. This construction prevents any possibility that the resin will tend to set in the guns during short intervals between operation thereof.

The mold 52 is mounted on a conveyor 59 which may comprise a belt 61 mounted on suitable rolls 62 and driven by a motor 63. The rolls 62 and motor are mounted on a table 64 which extends beneath the above-described apparatus and also beneath the means 15. It is to be understood that a suitable supporting framework, resting upon legs 66, is provided to support the above-indicated walls, slides, chambers, etc.

The color application means 14 is illustrated to comprise a hood 67 which extends transversely of the apparatus and is shown as being located in a chamber below the support plate upon which motor 31 is mounted. Color application means 14 is spaced from turbulence and mixing chamber means 12, the relationship being such that color is not applied by the means 14 until after the other ingredients have been applied to the mold 52 through the open bottom of chamber portion 44. A header 68 is provided above hood 67, and a plurality of downwardly extending nozzles 69 communicate with the header so that pigment received from the header will pass downwardly against the upper surface of the ingredients previously applied to the mold. Suitable air pressure or other means are provided to apply the pigment powder or liquid, as the case may be.

The above-described apparatus is particularly suited for production in which the simulated rocks in each panel are to be a relatively uniform type, that is to say have the same general color variation and appearance. It is to be understood, however, that the lower portion of the turbulence chamber means 12 may be small and connected to the upper portion thereof by a flexible conduit. Such small lower portion is preferably smaller in size than an individual rock to be simulated, and is applied (being manually movable) to a plurality of spaced portions of the mold. The coloring and other factors are then altered (or corresponding apparatus is employed) and the operation is repeated for other portions of the mold, the result being a simulated rock panel having a highly varied appearance. The pigment or coloring is then also applied to individual rocks by small portable spray means (corresponding to means 14) to provide different background coloring as desired. Different rocks are thus simulated in a single panel. For this type of operation the upper or feeding portion of the apparatus is made considerably narower to compensate for the much lower volume and for the narrow entrance to the flexible conduit to the lower portion of the turbulence chamber means.

It is to be understood that suitable valves and controls, speed reducers, etc., are provided for the various elements, including spray guns 49, motors 31 and 63, etc. It is also to be understood that individual controls may be supplied for the various rolls 36 and 27, and also for the roll 33. Also, valve means may be incorporated in slot or gate 43 to facilitate complete shut off when desired, as well as in the slot or gate 34 from the hopper 32.

The mold 52 is a female mold the upper surface of which is the converse of an exterior rock panel surface. A variety of materials may be employed in making each mold, in accordance with the type of rock to be reproduced, the quantity desired, and the shape of the rock. The mold may be made of concrete, vinyl, steel, aluminum, kirksite, etc. Vinyl molds are desirable when undercuts are present.

The mold 52 is made with a plurality of relatively large recesses 71 each adapted to simulate an individual stone or rock. The recesses are separated by ridges 72 which, in a finished rock panel, represent the grout lines between the individual rocks. Referring to FIGURES 3–5, the bottom wall of each recess 71 is not flat but instead contoured, being formed with a plurality of peaks or ridges 73 separated by valleys 74. In the finished rock, the peaks 73 represent the receesses or grooves in the rock, and the valleys 74 represent the protuberances or ridges.

In the illustrated embodiment, the mold 52 is formed of concrete or cement, and has imbedded therein a plurality of pipes 76 through which hot fluid may be passed for mold heating purposes. This greatly increases the production rate since it permits the partially finished product to be removed from the female mold prior to curing in the means 16.

It is to be understood that instead of being incorporated in the texture material hopper 32 above described, certain of the finer ingredients may be sprayed from the spray guns 49. These include gloss eliminator, fire retardant, etc.

The means 15 for insuring complete wetting and elimination of dry spots, and absence of bubbles, comprises a male mold or plug 77 having a general shape which is the converse of the female mold 52. However, and as best illustrated in FIGURE 5, the individual projecting protrusions or "rocks" 78 of the male plug are less contoured and do not conform exactly to the peaks 73 and valleys 74 of the female mold surface, the arrangement instead being such that thin spots 79 are maintained in the applied ingredients between the peaks or ridges 73 and the lower male plug surface.

The male mold 77 is mounted under a strong frame 81 which, in turn, is adapted to be lowered and raised by a hydraulic cylinder 82. The cylinder 82 is supported on a yoke or pedastals 83, and suitable supports 84 are provided below the conveyor belt 61 in order that downward shifting of the male plug will not result in bowing of the support table 64.

Cylinder 82 is adapted to create a mold pressure between 2 and 50 lbs. per square inch, a preferred pressure being approximately 15 lbs. per square inch. This pressure molding operation insures that the ingredients between the mold elements will be thoroughly wet and that any air bubbles, such as are indicated at 86a in FIGURE 4, will be removed. For certain shapes of rocks it is desirable to employ a pressure bag instead of a male plug, but the male plug is preferred for shapes such as those illustrated in the drawings.

In the illustrated embodiment, the female mold 52 is moved by the conveyor belt 61 from the mixing and turbulence chamber 12 and the color application means 14 directly to a station beneath the male plug 77. The conveyor motor 63 is then stopped, so that the female mold 52 remains stationary during insertion of the male plug. The male plug is inserted and then left in place until the resin has set, after which the simulated rock panel is removed from the molds and inserted into the means 16 for heat curing.

Lines for heating fluid are connected to the pipes 76 in the female mold in order to heat the same and thus speed the operation. This is done by quick couplings which are connected as soon as the conveyor belt stops, with the female mold directly beneath the male plug. The various means for feeding the ingredients onto the female mold are, of course, shut off by the control means as soon as the female mold has been conveyed therebeneath by the conveyor belt.

Instead of the above-described intermittent application operation in which the ingredient feed is turned off and the conveyor belt 61 is stopped each time a female mold is positioned beneath the male plug, the operation may be made continuous by providing a plurality of male plugs and associated apparatus at points spaced from the conveyor means. Each female mold is then transported to the male plug as soon as it passes beneath the color application means 14, and there is no necessity for shutting off the feed and spray apparatus after application of ingredients to each mold. For such an arrangement, a plurality of different shapes of molds 52 may be employed, and after application of the ingredients the particular female mold 52 is moved to the male plug apparatus corresponding thereto.

The heat curing means 16 is illustrated to comprise a suitable furnace 86 which may be heated by gas or electricity. Furnace 86 is adapted to contain a plurality of simulated rock panels, after separation thereof from their molds, and to heat the same for a period sufficient to effect complete curing and prevent the panels from smelling of chemicals. For example, in the case of panels made of polyester resin, curing may continue for 45 minutes at 220° Fahrenheit.

*Detailed Description of Method*

Proceeding first with a general description of one important aspect of the method, a mold 52 is first provided having a plurality of peaks or ridges 73 and valleys 74. A conventional mold release is applied to the mold surface, after which the texture material, synthetic resin and strengthening fibers are applied over the mold surface in such manner that the applied ingredients are relatively thin over the peaks 73 and relatively thick over the valleys 74, so that thin spots or areas 79 are formed. This is best illustrated in FIGURE 3, in which the strengthening fibers are schematically represented by the lines, the texture material by the small circles, and the gloss reducing and other fine ingredients by dots. The background color is then applied, as indicated in the dark layer at 87, over the previously applied ingredients. Because of the transparency or translucency of the plastic, and because the major portion of the larger texture material particles are disposed, as will be described below, in the valleys and at the sides of the peaks or ridges as distinguished from over the upper portions of the peaks or ridges, the background color 87 shows through the thin spots 79 and in varying degrees. This creates, after the materials have been removed from the mold, a colored or darkened appearance in the recesses in the finished paneling and has a very realistic appearance of weathered rock.

According to another important aspect of the method, the texture material, fiber glass, resin and other ingredients (except the background color) are mixed in mid air over the above-described female mold 52 and are then applied to the mold with sufficient force or velocity to cause the larger particles of texture material to be present over the peaks or ridges 73, in thin spots 79, only in small amounts if at all. The described manner of application of ingredients to the mold surface also aids in the creation of the thin spots 79 over the peaks 73, so that upon subsequent application of the background color 87 the recesses or grooves in the finished rock paneling will appear colored, such as brown or black, to simulate weathered rock. The mixing of the ingredients over the mold has the effect not only of greatly increasing the quantity of production and minimizing the expense thereof, but also of mixing the sections of fiber glass throughout the ingredients so that all portions of the applied material will be strengthened by the glass fibers. Furthermore, and very importantly, a sponge or capillary action results which aids in causing the ingredients to cling to the sides of recess 71 (at the left and right in FIGURE 4).

Proceeding with a more detailed description of the method, and in which the above two aspects are combined with other aspects, particular reference will be made to the apparatus illustrated in FIGURES 1 and 2 although it is to be understood that certain apparatus other than that shown may be employed. As previously stated, the pots 56 and 58 are filled with synthetic bonding resin, one pot also containing accelerator and the other pot also containing catalyst. The containers 23 are provided with balls 22 of fiber glass spun roving. Also, a mixture of texture material, gloss reducer or eliminator, and fire retardant material is placed in the hopper 32. Particularly where the texture material is white, a certain amount of pigment, preferably iron oxide, is also mixed in the hopper 32. As previously stated, there need be no pigment in the hopper 32 where ground rock having the desired natural color is employed, no fire retardant where such material is incorporated in the resin, and no gloss eliminator where such material is incorporated in or mixed with the resin.

After loading of the apparatus as stated above, a suitable mold release or parting compound is applied to the upper surface of the female mold 52. Thereafter, a part of the gloss reducer or eliminator is applied onto the mold surface in quantities sufficient to lightly coat the same. Such gloss reducer is preferably only a part of the total, the remaining portion being present in the hopper 32 or in the resin pots 56 and 58.

The conveyor motor 63 is then started to effect passage of mold 52 beneath the application apparatus at a relatively low speed. The various rolls, guns, etc., are started by the control equipment, causing mixture of the texture material and cut glass fibers in the upper portion 42 of turbulence and mixing chamber means 12, and in spraying of the resin from the guns 49 downwardly into the lower portion 44 of the turbulence and mixing chamber means 12. The mixed texture material, fiber glass, etc., is thus substantially completely wet in the lower chamber portion 44 and prior to striking the upper mold surface. Referring to FIGURE 3, which is schematic and exaggerated as previously stated, this method of application results in formation of thin spots 79 above the mold peaks or ridges 73, and also results in a relative absence of the coarser texture material in the thin spots 79 so that the transparency or translucency of the thin spots is maintained.

As the mold 52 passes beneath the color application means 14, the previously applied ingredients are dusted with iron oxide or other pigment from the nozzle 69. This results in application of the background color 87. The coated mold 52 then passes beneath the male plug 77, and cylinder 82 is operated to close the mold. The resulting pressure causes wetting of the iron oxide or other pigment powder, insures that all parts or components will be thoroughly wet, and elimniates the bubbles such as those indicated at 86a in FIGURE 4. As previously described, the shape of the male mold is such that the thin spots 79 remain, so that the background color 87 shows therethrough to cause the recesses in the finished panel to appear weathered and natural.

After the heated female mold has caused the resin to set, the mold is opened and the simulated rock panel is removed therefrom for placing in the furnace 16. The panel need remain in the closed mold apparatus 15 for only a few minutes when proper catalysts, accelerators and temperatures are employed. The curing time in the curing means 16 is substantially longer, as previously stated, on the order of 45 minutes. As soon as one female mold is removed from the pressure means 15, a second mold 52 is inserted beneath the mixing chamber 12 and the process is repeated.

After removal from the furnace 86, each panel is trimmed by a suitable trimming saw or cutting means, and may be backed with a solid material in order to increase its rigidity. It is also within the scope of the invention to apply additional resin, glass cloth or fibers, etc., above the background color layer 87 if desired.

As the next step in the method, simulated mortar is applied in the grout lines or grooves between the individual rocks. Such mortar preferably comprises a blend of granulated material, synthetic bonding resin and pigment. Alternatively, the simulated mortar may be applied to the panel before curing in the curing means or furnace 16.

After the simulated rock panel has been baked, it may be artificially weathered by sand blasting, wire brushing or the like.

Referring to FIGURE 6, a modification is illustrated in which a portion of the texture material is applied to the female mold 52 before it reaches the mixing and turbulence chamber means 12. This portion is preferably relatively small, and may be approximately two ounces per square foot. The pre-application of texture material aids in producing a contrast or natural appearance, and is particularly useful where the female mold has less pronounced peaks or ridges and valleys than does the one 52 previously described. Such a mold is indicated at 52a in FIGURE 6, the previously applied texture material being indicated at 88.

With the modification of FIGURE 6, application of resin, glass fibers and the balance of texture and other material when the mold 52a passes beneath the turbulence chamber means 12 causes a partial wetting of the pre-applied texture material 88. Such wetting is completed in the pressure application means 15, so that thorough wetting of all ingredients is achieved.

According to another modification, pigment is dusted or sprayed onto certain portions of the female mold prior to application of other ingredients. This has the effect of simulating rock which is streaked or stained, such as with iron oxide stains.

It is emphasized that the described rock panel, having deep grout lines or grooves, is impossible or very difficult and expensive to produce by apparatus other than the type described and illustrated herein. Such panels may be made by hand, and with glass cloth or mat, but are inferior and prohibitively expensive. All ingredients may be sprayed through special spray guns, but this is undesirable for reasons including the fact that the lengths of strengthening fiber, and the texture material size, are limited.

Simulated rock panels of a much flatter type, and having very shallow grout lines or grooves, are less difficult to produce. These may be manufactured not only as described above but also by making a dough or batter of substantially all ingredients and then rolling such batter (in a relatively stiff or doughy condition) onto a female mold. It is pointed out, however, that a number of features of the present invention are applicable to such types of simulated rock panels. For example, background color 87 may be employed although the effect is less pronounced because of less contour in the rock face. In the latter connection the thin spots should be quite thin, and the texture material relatively small in size, to permit the background color to show through. The finished panel should be backed, such as with resin and matting, since it has less strength than the deep grout line panels illustrated herein.

Proceeding next to a description of the quantities of materials, etc., it is emphasized that there should be a substantial proportion of larger particles of texture material in order to impart true rock texture and achieve other advantages recited in this specification. Another important criterion is that the amount of synthetic resin should be the minimum necessary for thorough wetting of all ingredients, since an excess of synthetic resin has a tendency to cause the product to shine. In this connection it is emphasized that the described method of application, with the turbulence and mixing chamber 12 and spray guns 49, etc., permits much less resin to be used than in situations where hand lay-up, for example, is employed. Of course, the quantity of material applied to the female mold should not be so great that the spots 79 are not sufficiently thin to permit the background color 87 to show through.

With reference to the above criteria, it has been found that the synthetic bonding resin should be present in the range of 15 to 60% by weight, and the texture material in the range of 20% to 85% by weight. The fiber glass should be present in the range of 20% to 50% by weight of the resin employed (as distinguished from the total mixture). The gloss inhibitor should be present in the range of 4% to 25% of the resin employed, and the flame retardant in the range of 4% to 25% of the resin employed. The pigment is present only in small amounts, normally less than 1% by weight of the total mixture. The percentage of resin includes the catalyst and accelerator, which are only present in small amounts. As previously indicated, the texture material should consist of a blend of particle sizes in the range of minus 16 to plus 80. Thus, the texture material preferably includes substantial amounts of minus 16 plus 30, minus 30 plus 40, minus 40 plus 80. Also, as previously stated, a major portion of the particulate material in the ingredients should be plus 80, and preferably plus 40, all U.S. standard sieve size.

*Description of the Simulated Rock Panel Constructed With the Above-Described Method and Apparatus*

It is believed that the resulting product or rock panel will be well understood by reference to the detailed description of the method and apparatus. Thus, the panel is characterized by simulated rock portions and simulated grout portions. The panel is also characterized by the presence of the texture material, strengthening fibers and other ingredients as described above. Also, and very importantly, the rock is characterized by the presence of the thin spots backed by background color and sufficiently transparent or translucent so the background color may be seen. In this connection it is emphasized that "thin spots" has reference to the distance between the background layer (number 87 in FIGURE 3) and the exterior surface of the simulated rock, it being understood that backing or other material may be placed behind the layer 87 without altering its effect. Also, the layer 87 of background color may in certain instances (such as where redistributed by the male plug) penetrate clear to the surface of the simulated rock instead of showing through the transparent or translucent resin mixture.

The distribution of ingredients in the simulated rock is best shown in FIGURE 3 and was described heretofore. In the preferred form, the glass fibers are distributed throughout the simulated rock, but the larger particles of texture material are disposed primarily in the valleys as distinguished from in the thin spots 79.

Following are specific examples of simulated rock constructed in accordance with the present invention. These examples are given in terms of weight per square foot of rock, it being pointed out that the simulated rock should range between ⅛ inch and ¼ inch in thickness.

EXAMPLE NUMBER I

|  | Oz. |
|---|---|
| 1. Transparent or translucent thermosetting polyester bonding resin | 8 |
| 2. Catalyst and accelerator | 0.16 |
| 3. Ground limestone blend ranging between minus 16 and plus 40 U.S. standard sieve size | 6 |
| 4. Diatomaceous silica particles (minus 100 U.S. standard sieve size) | 1.5 |
| 5. Antimony oxide | 0.5 |
| 6. Chlorowax | 0.5 |
| 7. Silane sized fiber glass spun roving (½ inch lengths) | 2 |
| 8. Iron oxide pigment powder | 0.025 |

EXAMPLE NUMBER II

| 1. Transparent or translucent epoxy bonding resin containing flame retardant | 8 |
|---|---|
| 2. Catalyst and accelerator | 0.15 |
| 3. Ground granite blend ranging between minus 16 and plus 40 U.S. standard sieve size | 6 |
| 4. Diatomaceous silica particles (minus 80) | 1.5 |
| 5. Silane sized fiber glass spun roving (¼ inch lengths) | 2 |
| 6. Iron oxide pigment powder | 0.03 |

EXAMPLE NUMBER III

| 1. Silane sized fiber glass spun roving (½ inch lengths) | 1½ |
|---|---|
| 2. Ground colored lava in a blend ranging between minus 16 and plus 80 U.S. standard sieve size | 8 |
| 3. Synthetic iron oxide pigment powder (dark gray) | .02 |
| 4. Mixture comprising 7% aluminum stearate, 2% Chlorowax, 1½% antimony oxide, 2% butyl peroxide, 1¼% dimethyl analine, balance thermosetting polyester bonding resin | 8 |

In the first two examples, a portion of the pigment is mixed with the texture material, and the remainder is applied as background color. In the third example, all of the pigment is applied as background color.

It is pointed out that in cases where the texture material is white or light colored, and pigment powder is blended therewith such as in hopper 32, the peaks or ridges in the simulated stone (not the mold) tend to be relatively white and the pigment is somewhat concentrated near the valleys in the stone (peaks in the mold). This produces a varied effect which is desirable for many types of simulated rock, and in combination with the background color effect (layer 87 in FIGURE 3) results in a striking simulation of various rocks.

The finished rock panels are applied to any desired surface, such as a previously erected wall, studs covered by building paper, etc., by nails, screws, mastic, or any other suitable means. Corner panels, and individual rocks constructed in accordance with the present invention, are employed as necessary. The joints between the panels (and nail holes) are covered with simulated mortar at the erection site, such motor preferably comprising synthetic bonding resin, texture material and a pigment.

In summary, it is pointed out that according to the broader aspects of the invention the simulated rocks may have a uniform thickness throughout instead of having thick spots and thin spots as described hereinbefore. In such cases, relative transparency and opacity is alone employed to permit background color 87 to show through in varying degrees and locations. For example, the male plug may have a contour identical to that of the female mold surface. With such construction, some of the thickly congregated ingredients in the valleys 74 are caused by the male plug to run up hill over peaks 73. The materials which run up hill do not generally include the heavier texture material, so the "thin spots" over peaks 73 are still transparent or translucent. Such up hill movement of some resin and finer texture material may also occur with the mold construction shown in the drawings and described in detail above, particularly in situations where the peaks 73 are so high that they are bare or almost bare (of everything except color 87) prior to application of the male plug.

Various embodiments of the present invention, in addition to what has been illustrated and described in detail, may be employed without departing from the scope of the accompanying claims.

I claim:

1. A method of manufacturing a simulated rock or stone panel, which method comprises providing a female mold having a plurality of relatively large recesses which are the converse of rocks and a plurality of beads or ridges separating said recesses and which are the converse of grout lines or grooves, at least some of said recesses having valleys and having peaks or ridges extending upwardly from said valleys, applying to said mold ingredients comprising a light-transmissive thermosetting synthetic bonding resin, strengthening fibers and particulate mineral texture material, the application of said ingredients to said mould being such that the ingredients are relatively thick and opaque over said valleys and are relatively thin and transparent or translucent over said peaks, and applying a pigment or coloring material over said ingredients to cause said coloring material to show through the thin portions over said peaks but not through the thick portions over said valleys, whereby the exterior surface of the finished product on the opposite surface thereof from said coloring material has recesses colored in accordance with said coloring material.

2. The invention as claimed in claim 1, in which said method includes employing a major portion of texture material having a size range between minus 16 U.S. standard sieve size and plus 80 U.S. standard sieve size, and causing the larger granules of said texture material to concentrate in the valleys in said mold and to be present over the peaks therein in insufficient quantity to prevent said coloring material from showing through said thin portions.

3. A method of manufacturing a simulated rock panel, which method comprises arranging in generally horizontal relationship a female mold having depressed portions simulating rocks and raised portions separating such depressed portions and simulating grout lines between rocks, at least some of said depressed portions having peaks or ridges and valleys, providing a plurality of continuous fiber glass strands each consisting of a substantial number of individual filaments, cutting relatively short lengths of fiber glass from said continuous strands and causing such short lengths to move toward said mold, feeding granulated texture material toward said mold and into contact with said short lengths of fiber glass, creating turbulence in the region of said texture material and fiber glass lengths to effect mixing thereof, directing a spray of synthetic thermosetting bonding resin into said mixed texture material and fiber glass in the air over said mold to effect substantially complete wetting thereof prior to contact with said mold, the direction of said resin spray being generally toward said mold to cause the wet fiber glass and the texture material to strike said mold at a velocity sufficient to cause a relatively thick congregation of materials in said valleys and a relatively thin congregation of materials over said peaks, applying coloring matter over the previously deposited materials at least in the region of said thin areas, causing the deposited material to set, and removing the panel from said mold whereby the completed panel when viewed from the surface previously adjacent said mold appears colored by said later-applied coloring material at said thin areas but not in the relatively thick areas previously over the mold valleys.

4. The invention as claimed in claim 3, in which said short lengths of fiber glass have lengths between ¼" and ¾", said texture material is ground rock having a particle size between minus 16 and plus 80, and said bonding resin is a thermosetting transparent or translucent polyester bonding resin.

5. The invention as claimed in claim 3, in which said method includes the step of depositing a quantity of texture material onto recessed portions of said female mold prior to application of the mixture comprising synthetic resin, short lengths of fiber glass and further texture material.

6. The invention as claimed in claim 4, in which a male plug is pressed over said coloring matter layer after application thereof and before setting of the deposited ingredients; and in which simulated mortar is coated, after removal of the simulated panel from said female mold, over the surface previously engaged by said grout-line simulating raised portions of said mold.

7. A simulated rock panel having a plurality of raised portions representing rocks or stones and also having a plurality of grooves representing grout lines between such rocks or stones, which panel comprises a mixture of transparent or translucent thermosetting synthetic bonding resin, fiber glass, and ground rock texture material the major portion of which has a particle size in the range of minus 16 plus 80 U.S. standard sieve size, at least some of said rock-simulating raised portions having relatively thick projecting or protuberant opaque areas and relatively thin recessed areas, said relatively thin recessed areas being sufficiently free from texture material of the larger particle sizes that the transparency or translucency thereof is maintained, and a layer of coloring material disposed on the interior of said rock-simulating raised portions, said coloring material showing through said relatively thin recessed areas but being prevented from showing through said relatively thick raised or protuberant opaque areas.

8. The invention as claimed in claim 7, in which said texture material has additional coloring material mixed therethrough and in which a gloss reducer and flame retardant are provided, characterized in that the minimum amount of bonding resin is employed in order to cooperate with said gloss reducer to provide an exterior surface substantially free from gloss or shine.

References Cited in the file of this patent

UNITED STATES PATENTS

| | | |
|---|---|---|
| 1,000,425 | Melzer | Aug. 15, 1911 |
| 1,031,190 | Liebau | July 2, 1912 |
| 1,638,108 | Barnes-Thomas | Aug. 9, 1927 |
| 1,864,794 | Bowker et al. | June 28, 1932 |
| 1,929,277 | Humphreys | Oct. 3, 1933 |
| 2,307,733 | De Vault | Jan. 12, 1943 |
| 2,379,163 | Landon | June 26, 1945 |
| 2,580,200 | Shrimpton | Dec. 25, 1951 |
| 2,629,135 | Johnson | Feb. 24, 1953 |
| 2,655,458 | Collins | Oct. 13, 1953 |
| 2,688,580 | Fingerhut | Sept. 7, 1954 |
| 2,698,271 | Clark | Dec. 28, 1954 |
| 2,702,261 | Bacon et al. | Feb. 15, 1955 |
| 2,713,697 | Willcox | July 26, 1955 |
| 2,751,962 | Drummond | June 26, 1956 |
| 2,752,275 | Raskin et al. | June 26, 1956 |
| 2,781,545 | Vallak | Feb. 19, 1957 |
| 2,782,544 | Tobin | Feb. 26, 1957 |
| 2,809,145 | McDermott | Oct. 8, 1957 |
| 2,819,495 | Krausz | Jan. 14, 1958 |
| 2,850,421 | Thompson | Sept. 2, 1958 |
| 2,951,001 | Rubenstein | Aug. 30, 1960 |